(12) United States Patent
Lee et al.

(10) Patent No.: US 7,891,133 B1
(45) Date of Patent: Feb. 22, 2011

(54) HYDRO STRAW MULCH

(75) Inventors: Edward Lee, Manteno, IL (US); Terry Peters, Worley, ID (US)

(73) Assignee: Hydrostraw, LLC, Manteno, IL (US)

( * ) Notice: Subject to any disclaimer, the term of this patent is extended or adjusted under 35 U.S.C. 154(b) by 876 days.

(21) Appl. No.: 11/253,957

(22) Filed: Oct. 19, 2005

(51) Int. Cl.
*A01G 7/00* (2006.01)

(52) U.S. Cl. .......................................................... 47/9

(58) Field of Classification Search .................. 47/9, 47/57.6, 1.01 F, 1.01 T, 58.1 SC, DIG. 10, 47/DIG. 9
See application file for complete search history.

(56) References Cited

U.S. PATENT DOCUMENTS

| | | | |
|---|---|---|---|
| 2,128,928 A * | 9/1938 | Estes ........................... 162/75 |
| 3,482,353 A * | 12/1969 | Fischer et al. ................. 47/9 |
| 4,297,810 A * | 11/1981 | Hansford ....................... 47/9 |
| 4,369,597 A | 1/1983 | Leep et al. |
| 5,443,612 A * | 8/1995 | Havens .......................... 71/5 |
| 5,741,832 A * | 4/1998 | Spittle ....................... 523/132 |
| 5,879,695 A | 3/1999 | Bastiaansen et al. |
| 5,942,029 A | 8/1999 | Spittle |
| 6,076,299 A | 6/2000 | Spittle et al. |
| 6,158,167 A | 12/2000 | Spittle |
| 6,349,499 B1 | 2/2002 | Spittle |
| 6,360,478 B1 * | 3/2002 | Spittle ........................... 47/9 |
| 6,523,299 B2 * | 2/2003 | Morris ............................ 47/9 |
| 6,593,277 B2 | 7/2003 | Adamoli, Jr. et al. |
| 6,622,424 B1 | 9/2003 | Fouan |
| 6,672,001 B1 | 1/2004 | Ali et al. |
| 6,688,038 B1 | 2/2004 | Paternoster et al. |
| 6,835,761 B2 * | 12/2004 | Harrison ....................... 523/132 |
| 2001/0053545 A1 * | 12/2001 | Engwer ......................... 435/262 |
| 2004/0043217 A1 * | 3/2004 | Dezutter et al. .............. 428/407 |
| 2004/0244928 A1 * | 12/2004 | Huang et al. ................. 162/135 |
| 2005/0176583 A1 * | 8/2005 | Stamets ......................... 504/100 |
| 2006/0070294 A1 * | 4/2006 | Spittle ............................ 47/9 |

FOREIGN PATENT DOCUMENTS

FR 2558035 A1 * 7/1985

* cited by examiner

*Primary Examiner*—Andrea M Valenti
(74) *Attorney, Agent, or Firm*—Wyatt, Tarrant & Combs, LLP

(57) ABSTRACT

A combination hydro straw mulch is used for hydroseeding and hydromulching for seed establishment and erosion control. The formulation of is preferably, but not limited to, approximately 85% hammermilled straw, approximately 10% hammermilled paper, and approximately 5% processed jute fibers. The hammermilled straw is preferably Kentucky Bluegrass straw. The hammermilled paper particles are used for its water holding capacity. The paper aids in pumpability and reduces the amount of water required for pumping a quantity of mulch. The processed jute fibers tangle the straw fibers on the ground to produce a secure ground covering. The hydro straw mulch of the present invention may include other additives as well. Tackifiers and flocculants aid pumpability and help tack the straw fibers to the ground and aid in water infiltration and water clarity. A surfactant ensures wetability. Other additives include green dye.

16 Claims, 1 Drawing Sheet

HYDRO STRAW MULCH

FIELD OF THE INVENTION

The present invention relates to the field of erosion control and seed establishment with hydroseeding and hydromulching.

BACKGROUND OF THE INVENTION

Existing systems for erosion control and seed establishment use paper or wood hydro mulch. These paper or wood hydro mulches are difficult to use and have low performance efficiencies. Additionally, application of paper and wood hydro mulches is limited by the amount of water that can be carried on a hydro mulch spreader. Generally, paper and wood hydro mulches require large quantities of water for efficient spreading. Use of straw mulches has not been successful in hydro seeding.

Clogging of the pumps and nozzles during hydroseeding and hydromulching is a problem that needs to be carefully avoided. Stopping operations to clean pumps and nozzles creates down time and can require disassembly and reassembly or replacement at great costs. When hydroseeding or hydromulching is done along highways and roads delays increase dangers associated with these operations.

Generally, paper or wood hydro mulches spread seed and mulch by using truck mounted pumps and water cannons for large area applications. Alternatively, the water, mulch and seed mix may be pumped and distributed through hoses and nozzles for residential type applications.

Straining and stratification of the components of the water, seed and mulch mixture by bunching and accumulating of some mulch components is a problem that may not be noticed for extended times, even several months. The first indication of a problem may be grass coverage inconsistencies in the hydroseeded and hydromulched areas. Problems are encountered that must be resolved. Reseeding with attendant time and materials may be necessary with high costs.

To prevent product or component jams high ratios of water to solids are used. High rations of water to solids require time interruptions for terminating hydroseeding or hydromulching while replenishing water tanks on trucks.

Needs exist for new products that require less water for application and that improve and increase erosion control and seed establishment.

SUMMARY OF THE INVENTION

The present invention provides a high lofted product that is a combination of fine hammermilled straw and hammermilled paper for partially releasing fibers. The fibers remain attached at ends to other fibers in the straw shafts and the paper particles. Jute fibers are processed, such as by hammermilling, to release short individual fibers that are used in small quantities to tangle the straw fibers. One product is a combination of straw, paper and jute fibers with tackifiers, flocculants and surfactants. The flocculants agglomerate neighboring, fluffed exposed fibers on the expanded straw particles. The tackifiers hold the straw fibers together and on the ground. The surfactants suspend the solids in the water and aid pumpability. The tackifiers also aid in holding the fibers attached to adjacent fibers. The tackifiers, flocculants, and surfactants are also agro chemicals that aid growth when the products are used in hydroseeding and hydromulching for seed establishment and erosion control.

The invention includes a combination straw mulch using as a primary fiber up to about 40 to 90 percent or more fine lawn grass straw, which is a byproduct of lawn seed production, or other types of straw. The straw is hammermilled for shortening, separating and abraiding. The straw may be blown against abraiding wheels or mixed with abraidant, and is then separated from the abraidant, such as by air stratification.

The preferred mixture also includes up to about 5 to 60 percent or more by weight hammermilled paper particles mixed with the fine grass straw for holding water and pumpability. Up to about 5 percent or more, by weight, of jute fibers are used to tangle with the straw fibers and the paper particles on the ground. The jute fibers are processed by hammermilling. Jute fibers are chopped and recycled from sources such as baled jute fibers or burlap bag scrap. About one to five percent by weight of tackifier and 0.25 percent or less by weight of flocculent are mixed with the fibers for wetting the fibers, reducing stratification and for lubrications of pumps in hoses to reduce clogging in the hydroseeder. The tackifier is preferably an organic tackifier such as guar, plantago or starch based tackifiers. The flocculent is preferably, but not limited to, PAM (polyacrylamide). Sufficient surfactant, such as ionic or non-ionic detergent, for example, less than about one half percent, is added to wet all of the water, paper and fibers, and to promote fast water absorption in the mixing tank prior to pumping and after spreading when lying on the ground and receiving water through rain or irrigation.

The hydro straw mulch of the present invention is composed of mainly straw, and enables pumps to pass the mulch easily through a hydroseeder and perform erosion control and seed establishment equal to or better than the industry standard wood and paper hydro mulches. The straw, paper and jute hydromulch is hydraulically spread in a slurry solution and normally contains seed and fertilizer with the mulch.

After the straw and jute are hammermilled the paper, tackifier, flocculent, surfactant and dye is added before they compressed into bales, usually of about 40-50 lbs each. The compressed bales reduce freight costs and provide easy onboard storage on hydroseeding units. This present invention is use the same way as conventional wood or paper hydromulch. The, dry materials in the bales are broken up and fed into hydroseeder tank as water is being added. The water and dry materials are fed into a mixing tank in a hydroseeder in predetermined proportions. Fertilizer and seed may be added to the dry mulch material as it is broken up or to the water mixing tank. Various ratios and mixtures are possible. The mixer apparatus combines and wets the materials before the slurry passes from the mixer apparatus directly into the pump intake. The hydro straw mulch of the present invention may be run at approximately 75 lbs mulch in approximately 100 gallons of water when doing hydroseeder tower work and 60 lbs mulch in approximately 100 gallons of water when Hydroseeding with a hose.

The formulation of the present invention is preferably, but not limited to, approximately 40-90%, and preferably about 85%, hammermilled straw, approximately 5-50%, and preferably about 10%, hammermilled paper, approximately 2-10%, and preferably about 5%, processed jute fibers by weight, and about 0.5% to 5% of the of tackifiers, flocculants and surfactants.

The hammermilled straw is preferably, but not limited to, Kentucky Bluegrass straw. The hammermilled straw may also be grass seed, cereal grains, rice, soybeans, kenaf, or combinations thereof. In one embodiment, the straw is a fine lawn grass straw separated from lawn seed and hammermilled to sizes of about 6 to 13 mm, and preferably abraided to partially release fibers for entanglement. The paper is hammermilled to industry standards or purchased pre-ground. The hammermilled paper is used for its water holding capacity. The paper aids in pumpability and reduces mulch clogging in the hydroseding machine hoses and pump. That increases the operational time of hydroseeders and hydromulch spreaders by reducing the down time required for refilling onboard water tanks. The processed jute fibers tangle the straw fibers on the ground to produce a secure ground covering. The jute fibers are hammermilled to a size of about 7-15 mm, and have fully or partially exposed naturally crimped fibers for entangling the straw fibers.

The hydro straw mulch of the present invention may include fertilizer and other additives as well. Organic tackifiers and PAM flocculants aid pumpability and help tack the straw fibers to the ground. A surfactant ensures wetability of the straw fibers, paper, and jute fibers during the mixing process and during rain or irrigation while the product is on the ground. Other additives may include green dye for providing optical feedback of coverage when hydroseeding.

The jute fibers aid entanglement without reducing pumpability.

In another embodiment of the product, hammermilled grass straw, which has been shortened and from which fiber ends extend, is mixed with hammermilled paper particles with or without a small amount of jute fibers to aid tangling.

These and further and other objects and features of the invention are apparent in the disclosure, which includes the above and ongoing written specification, with the drawings.

DETAILED DESCRIPTION OF THE PREFERRED EMBODIMENTS

Figure 1:
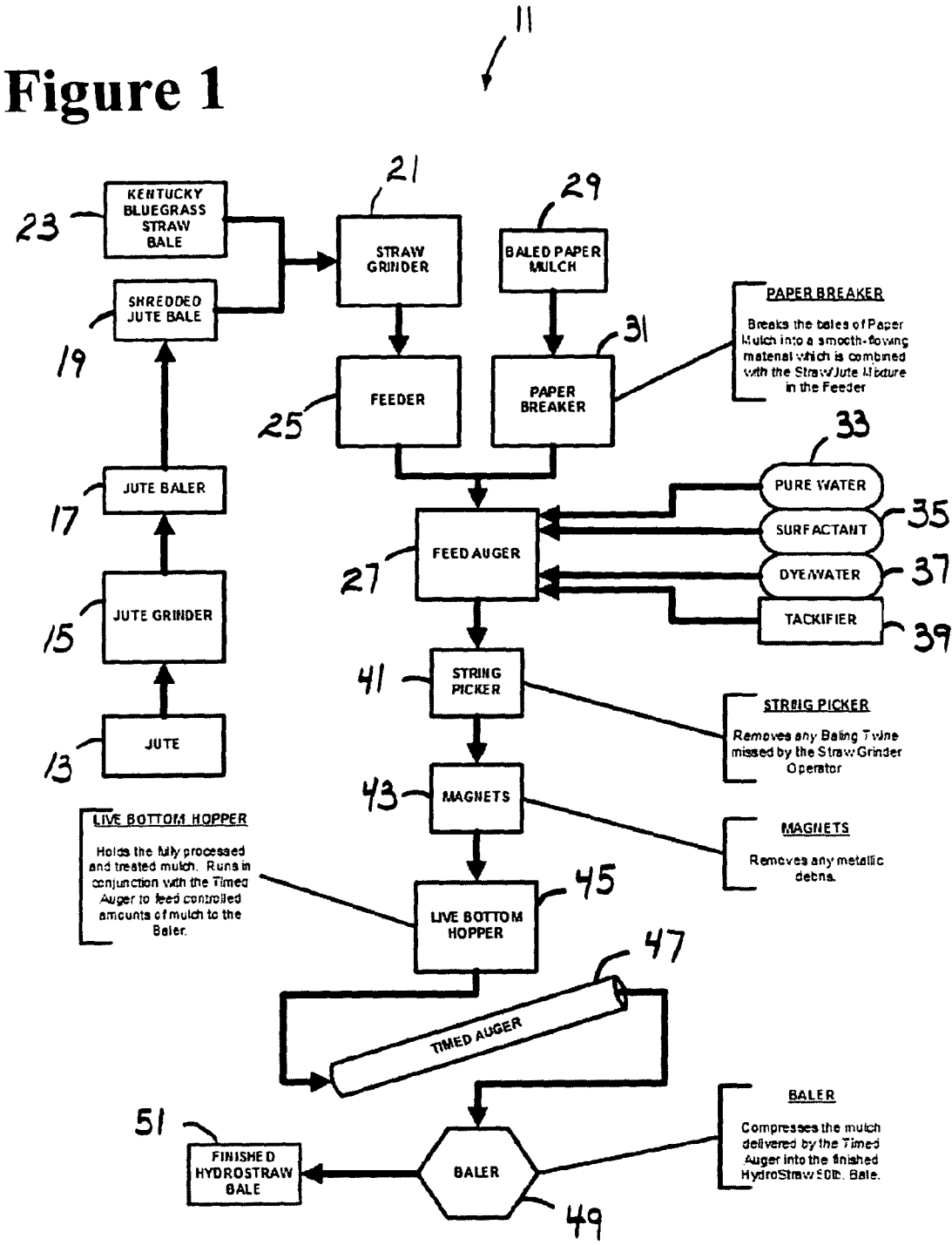
FIG. 1 is a schematic diagram of the product process.

The present invention provides a high lofted product that is a combination of fine hammermilled straw and hammermilled paper for partially releasing fibers. The fibers remain attached at ends to other fibers in the straw shafts and the paper particles. Jute fibers are processed, such as by hammermilling, to release short individual fibers that are used in small quantities to tangle the straw fibers. The product is a combination of straw, paper and jute fibers with tackifiers, flocculants, dye and surfactants. The flocculants aids in soil water infiltration rates and increase water clarity of runoff. The tackifiers hold the straw fibers together and on the ground. The surfactants suspend the solids in the water and aid pumpability. The tackifiers also aid in holding the fibers attached to adjacent fibers. The tackifiers, flocculants, and surfactants are also agro chemicals that aid growth when the products are used in hydroseeding and hydromulching for seed establishment and erosion control.

FIG. 1 shows a process 11 for creating the product. Jute 13 is fed into a jute grinder 15. The ground jute is then fed into a jute baler 17 to create a jute bale. The jute bale is then shredded 19 before being fed into a straw grinder 21 with bales of grass straw 23. The combined jute and grass straw are processed in the straw grinder 21. The ground straw and jute exit the straw grinder 21 and are transported to a feeder 25. The feeder 25 supplies the ground straw and jute to a feed auger 27. Baled paper mulch 29 is fed into a paper breaker 31. The paper breaker 31 breaks the bales of paper mulch into a smooth flowing material that is combined with the straw and jute mixture in the feed auger 27.

While the feed auger 27 moves the mixed straw, jute and paper mulch, additives are added. Additives may include pure water 33, surfactant 35, dye water 37, tackifier 39 and other additives. The processed mixture of straw, jute and paper then passes through a string picker 41. The string picker 41 removes any bailing twine missed by the straw grinder 21. The mixture of straw, jute and paper then passes through a magnetic device 43 that removes any metallic debris.

The processed combination of straw, jute and paper is then held in a live bottom hopper 45. The live bottom hopper 45 holds the fully processed and treated mulch. The live bottom hopper 45 operates in conjunction with a timed auger 47 that feeds controlled amounts of mulch to a baler 49. The baler 49 compresses the mulch from the timed auger 47 into bales of a desired size. Finished bales 51 exit the baler 49.

The invention includes a combination straw mulch using as a primary straw fiber up to about 40 to 90 percent or more fine lawn grass straw, which is a byproduct of lawn seed production, or other types of straw. The straw is hammermilled for shortening, separating and abrading. The straw may be blown against abrading wheels or mixed with abraidant, and is then separated from the abraidant, such as by air stratification. Alternatively, the straw may be fiberized by steaming and disc milling in a fiberizing mill.

The preferred mixture also includes up to about 5 to 60 percent or more by weight hammermilled paper particles mixed with the fine grass straw for holding water and pumpability. Up to about 5 percent or more, by weight, of jute fibers are used to tangle with the straw fibers and the paper particles on the ground. The jute fibers are processed by hammermilling. Jute fibers are chopped and recycled from sources such as baled jute fibers or burlap bag scrap. About one to five percent by weight of tackifier and about 0.25 percent or less by weight of flocculent are mixed with the fibers for wetting the fibers and preventing stratification. The tackifier is preferably an organic tackifier such as guar, plantago or starch based tackifiers. The flocculent is preferably, but not limited to, PAM (polyacrylamide). Sufficient surfactant, such as ionic or nonionic detergent, for example, less than about one half percent, is added to wet all of the water, paper and fibers, and to promote fast water absorption in the mixing tank prior to pumping and after spreading when lying on the ground and receiving water through rain or irrigation.

The hydro straw mulch of the present invention is composed of mainly straw, and enables pumps to pass the mulch easily through a hydroseeder and perform erosion control and seed establishment equal to or better than the industry standard wood and paper hydro mulches. The straw, paper and jute hydromulch is hydraulically spread in a slurry solution and normally contains seed and fertilizer with the mulch.

After the elements are hammermilled and the ingredients are added and then compressed into bales, usually of about 40-50 lbs each. The compressed bales reduce freight costs and provide easy onboard storage on hydroseeding units. In order to use the hydromulch of the present invention, dry materials in the bales are broken up and fed into a dry hopper, which further reduces and separates clumps. Water is held in a reservoir on the hydroseeder or hydromulch spreader. The water and dry materials are fed into a mixing tank in a hydroseeder in predetermined proportions. Fertilizer and seed may be added to the dry mulch material as it is broken up or to the water mixing tank. Various ratios and mixtures are possible. The mixer apparatus combines and wets the materials before the slurry passes from the mixer apparatus directly into the pump intake. The hydro straw mulch of the present invention may be run at approximately 75 lbs mulch in approximately 100 gallons of water when doing hydroseeder tower work and 60 lbs mulch in approximately 100 gallons of water when Hydroseeding with a hose.

The formulation of the present invention is preferably, but not limited to, approximately 40-90%, and preferably about 85%, hammermilled straw, approximately 5-50%, and preferably about 10%, hammermilled paper, approximately 2-10%, and preferably about 5%, processed jute fibers by weight, and about 1% to 5% additives of tackifiers, flocculants, dye and surfactants.

The hammermilled straw is preferably, but not limited to, Kentucky Bluegrass straw. In one embodiment, the straw is a fine lawn grass straw separated from lawn seed and hammermilled to sizes of about 6 to 13 mm, and preferably abraided to partially release fibers for entanglement. The paper is hammermilled to industry standards or purchased preground. The hammermilled paper is used for its water holding capacity. The paper aids in pumpability and reduces clogging in hoses and pump of the hydroseeder. That increases the operational time of hydroseeders and hydromulch spreaders by reducing the down time required for refilling onboard water tanks. The processed jute fibers tangle the straw fibers on the ground to produce a secure ground covering. The jute fibers are hammermilled to a size of about 7-15 mm, and have fully or partially exposed naturally crimped fibers for entangling the straw fibers.

The hydro straw mulch of the present invention may include fertilizer and other additives as well. Organic tackifiers and PAM flocculants aid pumpability and help tack the straw fibers to the ground and aid in water infiltration and water clarity. A surfactant ensures wetability of the straw fibers, paper, and jute fibers during the mixing process and during rain or irrigation while the product is on the ground. Other additives may include green dye for providing optical feedback of coverage when hydroseeding.

The jute fibers aid entanglement without reducing pumpability.

In another embodiment of the product, hammermilled grass straw, which has been shortened and from which fiber ends extend, is mixed with hammermilled paper particles with or without a small amount of jute fibers to aid tangling.

While the invention has been described with reference to specific embodiments, modifications and variations of the invention may be constructed without departing from the scope of the invention.

The invention claimed is:

1. A fibrous hydro mulch product comprising:
   hammermilled straw having separated fibers partially released from the straw, finely divided paper particles mixed with the hammermilled straw, jute fibers mixed with the hammermilled straw and the finely divided paper particles.

2. The product of claim 1, further comprising an adhesive tackifier, mixed with the hammermilled straw, the finely divided paper particles and the jute fibers.

3. The product of claim 2, further comprising a surfactant mixed with the hammermilled straw, the finely divided paper particles and the jute fibers.

4. The product of claim 1, further comprising a surfactant mixed with the hammermilled straw, the finely divided paper particles and the jute fibers.

5. The product of claim 1, wherein the mixed hammermilled straw, finely divided paper particles and jute fibers are mixed with a tackifier, a flocculent, dye and a surfactant for forming a hydro mulch product.

6. The hydro mulch product of claim 5, wherein the tackifier, flocculant, and surfactant are also agro chemicals that aid growth.

7. The product of claim 1, wherein the hammermilled straw is selected from the group consisting of straw from grass seed, cereal grains, rice, soybeans, kenaf, and combinations thereof.

8. The product of claim 1, wherein the hammermilled straw is present at about 60 to about 90 percent, the finely divided paper particles are present at about 5 to about 20 percent, and the jute fibers are present at about 2 to about 10 percent, all by weight.

9. The product of claim 8, further comprising about 0.025 to 5 percent tackifier and flocculent sufficient for tacking fiber together and to soil surface and to increase water infiltration and aid in water clarity, and less than 1 percent surfactant for wetting the hammermilled straw, the finely divided paper particles and the jute fibers upon the addition of water.

10. The product of claim 1, wherein the jute fibers are used to tangle the straw fibers and paper particles.

11. The hydro mulch product of claim 1, further comprising water in a ratio of about 100 gallons per 75 pounds of straw, paper fibers, and jute fibers, wherein the product can be applied by hydroseeder tower without clogging.

12. The hydro mulch product of claim 1, wherein the straw is 6-13 mm in length and the jute fibers are 7-15 mm in length.

13. A fibrous hydro mulch product comprising:
   hammermilled fine grass straw having separated fibers partially released from the straw, finely divided paper particles mixed with the hammermilled straw, jute fibers mixed with the hammermilled straw and the finely divided paper particles.

14. The product of claim 13, wherein the fine grass straw is blue grass straw.

15. A fibrous hydro mulch product comprising:
   hammermilled straw having separated fibers partially released from the straw, finely divided paper particles mixed with the hammermilled straw, jute fibers from burlap scrap mixed with the hammermilled straw and the finely divided paper particles.

16. A hydro mulch product made by the method of
   hammermilling straw to provide providing fibrous straw with short straw shafts having fibers partially exposed from and extending from the straw shafts,
   providing paper particles,
   providing jute fibers,
   mixing the fibrous straw, the paper particles and the jute fibers, and
   packaging the compressed mixed fibrous straw, paper particles and jute fibers for transportation to a point of use.

* * * * *